Patented Sept. 8, 1942

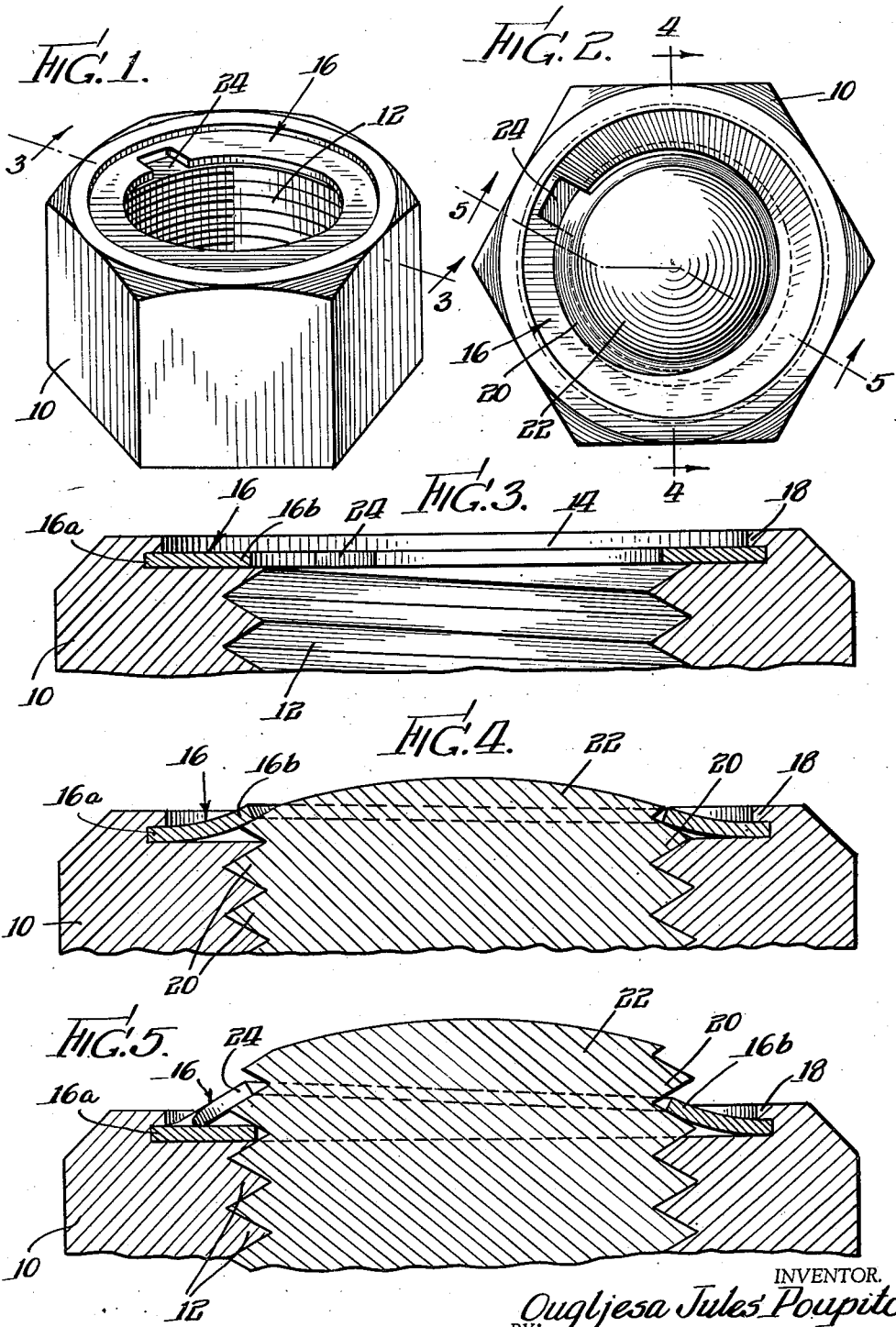

2,295,234

UNITED STATES PATENT OFFICE 2,295,234

LOCK NUT

Ougljesa Jules Poupitch, Chicago, Ill., assignor to
Illinois Tool Works, Chicago, Ill., a corporation
of Illinois Application February 20, 1941, Serial No. 379,739

6 Claims. (Cl. 151—22)

This invention relates generally to lock nuts and more particularly to lock nuts of the type designed to coact with the complementary thread of a screw member or bolt and thereby prevent loosening when the bolt is subjected to vibration.

The present invention contemplates lock nuts of extremely simple construction wherein the inner margin of an arcuate spring member is adapted to lockingly engage the complementary thread of a screw member or bolt.

More specifically the invention contemplates a threaded nut body provided with a long, narrow, arcuate spring which has one of its side edges permanently secured to the nut body and the other side edge positioned to enter between the threads of a bolt when the bolt and nut are telescopically associated. The threads of the nut force one side edge of the spring to lie in a helix while the other side edge of the spring is held in a common plane by its permanent attachment to the nut. This causes a distortion of the entire spring within its yield point, so that the one side edge of the spring exercises a strong frictional engagement with the threads of the bolt or screw member which prevents unscrewing when the bolt and nut are subjected to vibration.

For convenience in manufacture, the long, arcuate spring is most desirably formed as a part of a flat annulus of spring metal, having a circular outer edge permanently fixed to the nut. The annulus may have one or more cuts or notches extending inwardly from its inner periphery which provide for the free passage of the thread on the screw member or bolt and form the free part of the annulus into a long, narrow, arcuate spring or into a number of springs.

In accordance with the invention, a threaded nut body is provided having a flange which grips the outer margin of the resilient locking element mentioned above so as to connect the nut body and locking element together as a rotatable unit. The dimensional relation between the radial width of the marginal portion of the locking member overlapped by the flange of the nut structure and the radial width of the portion extending inwardly from said overlapped portion is preferably such as to permit helical distortion of the inner margin of the locking member in conformity with the helix of a complementary screw thread on the bolt without helically stressing the stock of said locking member beyond its yield point.

The foregoing and numerous other objects and advantages will be more apparent from the following detailed description when considered in connection with the accompanying drawing wherein:

Fig. 1 is a perspective view of a lock nut which is representative of one embodiment of the invention;

Fig. 2 is a plan view of the lock nut of Fig. 1 shown in its initial operative association with the shank of a screw member;

Fig. 3 is an enlarged transverse sectional view taken substantially along the line 3—3 of Fig. 1;

Fig. 4 is an enlarged transverse sectional view taken substantially along the line 4—4 of Fig. 2; and Fig. 5 is a similar transverse sectional view taken substantially along the line 5—5 of Fig. 2.

Referring now to the drawing wherein like numerals have been employed to designate similar parts throughout the various figures, it will be seen that the invention contemplates a conventional nut element or body 10 provided with internal threads 12. One extremity of the nut body 10 oppositely disposed from the clamping side thereof is preferably formed with a relatively shallow counterbore 14 to receive a flat annulus or locking member 16. The low cylindrical wall defining the shallow counterbore or recess 14 is swaged over the locking member 16 so as to provide a retaining flange 18.

The locking annulus 16 is of uniform thickness and is preferably made of spring metal, the inner margin of which is adapted to follow within the valley of the complementary thread 20 of a bolt or screw member 22. In order that the inner margin of the annulus may follow within said thread valley, it is made of relatively thin stock and yet possesses sufficient resiliency to provide an effective lock against inadvertent retrograde rotation of the nut body 10.

To facilitate the automatic helical deformation of the inner margin of the locking annulus 16, I provide a recess or notch 24. It will thus be apparent that the locking annulus 16 provides a long, narrow, arcuate spring whose outer margin 16a is permanently fixed in the nut body through the agency of the overlying retaining flange 18 and whose inner margin 16b is positioned to enter between the threads of the bolt or screw member 22. This action is clearly illustrated in Figs. 2, 4 and 5. The inner diameter of the locking annulus 16 approximates the root diameter of the complementary screw thread 20.

When the nut body is initially applied to the screw member 22, said body spins freely upon the screw member until the locking annulus 16 engages the outermost thread convolution of the screw member. The inner margin 16b of the locking annulus is initially flexed upwardly, as illustrated in Fig. 4, and the notch 24 facilitates automatic registration of said inner margin with the helical valley of the screw thread 20. Continued rotation of the nut causes helical distortion of the inner margin 16b in conformity with the helical thread on the screw member with the sections of the annulus stock which define the notch 14 resting within adjacent thread convolutions or valleys of the screw member 22, as clearly illustrated in Fig. 5. As the outer margin or side edge 16a of the spring annulus 16 is held in a common plane by the flange 18, the whole spring becomes distorted and stressed. As a result, the inner side edge or margin 16b, and particularly the ends of said margin 16b which lie at the notch 24, are resiliently forced against the threads of the bolt and exercise a strong frictional grip thereon.

To obtain the above mentioned operation, it is evident that the locking annulus 16 must have a thickness materially less than the pitch of the threads of the nut and bolt, so that its inner margin may enter well between adjacent thread convolutions of the bolt. It is important that the annulus 16 possess sufficient resiliency to permit the helical distortion thereof without stressing the spring metal beyond its yield point. In this connection it should be understood that by the term "yield point" I refer to that point of stress beyond which the material is in such a state that it will not recover any portion of its former shape. That is to say, if the inner margin 16b of the locking annulus 16 is helically stressed to such a degree that it will not exert a tendency to return to its unstressed position, the "yield point" of the material will have been reached. Under such circumstances frictional forces resulting from the aforesaid tendency of the spring material to return to its original shape are not experienced. The present invention contemplates a locking annulus of the type described above wherein locking efficiency is enhanced by the presence of maximum frictional forces acting to oppose loosening of the bolt and nut when subjected to vibration. The above mentioned degree of resiliency can be obtained by the use of thin, normally flat springs as disclosed in the drawing. Where less than the maximum holding power is desired, the spring may be given a slight initial or normal distortion from the flat toward the thread helix. This will of course reduce the stress which is placed on it when the threads of the bolt force its inner side margin or edge to take the form of the thread helix.

In some instances it has been found desirable to employ more than one notch in the annulus. In fact it has proved satisfactory to provide as many as three notches, such notches dividing the inner or free margin of the spring annulus into three arcuate springs, each of which is positioned to enter between the threads of the bolt. It is to be understood, however, that in the event that more than one notch is employed, the locking spring section is essentially long and narrow, as its length, even when measured along the shorter side, is several times as great as its width. This is important in securing effective spring action when one side edge of the spring annulus weaves in between the threads of the bolt. By employing the retaining flange 18, the locking annulus 16 is not only firmly secured in place but the radial width of that portion of the annulus which is helically stressed is kept to a desired minimum.

The resistance offered by the fixed outer margin of the annulus secured beneath the flange when the inner margin thereof is helically stressed cooperates in establishing powerful thread gripping forces. Also, the flange grips the outer margin of the locking annulus along a circular area and hence forces tending to rotate the annulus and nut as a unit are applied along the entire circumference of the annulus at points uniformly spaced from the center. Therefore, the annulus experiences no tendency to buckle or warp when such turning forces act upon it. The dimensional relation between the radial width of the outer marginal portion of the annulus overlapped by the flange 18 and the radial width of the portion extending inwardly from the flange is such as to permit helical disposition or flexing of the spring annulus in conformity with the helix of a complementary screw thread without helically stressing the stock of the annulus beyond its yield point.

It will be apparent from the foregoing description that the invention is not limited to the specific disclosures herein but is capable of other modifications and changes without departing from the spirit and scope of the appended claims.

The invention is hereby claimed as follows:

1. A lock nut comprising a threaded nut body, and a long, narrow, arcuate spring, having its outer circumferential margin permanently and rigidly fixed to the nut body and having its inner circumferential margin unthreaded and positioned to enter between the threads of a complementary screw member and be helically distorted thereby as the nut body is threaded on said member.

2. A lock nut comprising a threaded nut body, and a long, narrow, arcuate, normally flat spring, having its outer circumferential edge permanently fixed on the nut body against forces tending to move the outer margin of the spring and nut body relatively and its inner circumferential edge positioned to enter between the threads of a complementary screw member and being helically distorted thereby outwardly of the nut body in the direction of movement of the screw member through the nut body.

3. A nut lock comprising a normally threaded nut body, and a thin annulus of spring metal having an outer circular edge permanently fixed to the nut body and containing a severance in its inner edge forming its free portion into a long, narrow, arcuate spring whose inner edge is positioned to enter between the threads of a complementary screw member.

4. A lock nut comprising a threaded nut body, having a spring annulus receiving section oppositely disposed from the clamping surface thereof, a locking annulus associated with said receiving section, said annulus consisting of a long, narrow, arcuate spring having an inner unthreaded margin positioned to enter between the threads of a complementary screw member and to be helically distorted thereby, and means forming a part of the nut structure marginally overlying and gripping the outer margin of said locking annulus so as to secure said annulus and nut body together as a rotatable unit.

5. A lock nut comprising an internally threaded nut element having a concentric disc receiving section oppositely disposed from the clamping surface thereof, a locking member comprising an annular section of firmly resilient metallic sheet stock associated with said receiving section, and means forming a part of the nut structure marginally overlying and gripping the outer margin of said locking member so as to secure said locking member and nut element together as a rotatable unit, the inner margin of said locking member being of such gauge as to enable circumferential association thereof with the root portion of a complementary screw thread and having a diameter approximating the root diameter of said complementary screw thread, said inner margin being severed at not more than three points to permit axial separation of the stock in the vicinity of a said point and the consequent helical disposition of the remainder of said stock in conformity with the helix of said complementary screw thread, the dimensional relation between the radial width of the outer marginal portion of the locking member overlapped by the nut structure and the radial width of the portion extending inwardly from said overlapped portion being such as to permit helical disposition of the inner margin of the locking member in conformity with the helix of a complementary screw thread without helically stressing the stock of said locking member beyond its yield point.

6. A lock nut comprising an internally threaded nut element having a concentric disc receiving section oppositely disposed from the clamping surface thereof, a locking member comprising an annular section of firmly resilient metallic sheet stock associated with said receiving section, and means forming a part of the nut structure marginally overlying and gripping the outer margin of said locking member so as to secure said locking member and nut element together as a rotatable unit and oppose relative rotation and radial movement of said member relative to said nut, said locking member being of uniform thickness, said thickness being such as to enable circumferential association of the inner margin thereof with the root portion of a complementary threaded member and having a diameter approximating the root diameter of said complementary screw thread, said inner margin being severed to permit axial separation of the stock in the vicinity of said severance in the direction of movement of the threaded member through the nut element and the consequent helical disposition of the remainder of said stock in conformity with the helix of said complementary screw thread, the dimensional relation between the radial width of the outer marginal portion of the locking member overlapped by the nut structure and the radial width of the portion extending inwardly from said overlapped portion being such as to permit helical disposition of the inner margin of the locking member in conformity with the helix of a complementary screw thread without helically stressing the stock of said locking member beyond its yield point.

OUGLJESA JULES POUPITCH.